US009515325B2

United States Patent
Hsieh et al.

(10) Patent No.: US 9,515,325 B2
(45) Date of Patent: Dec. 6, 2016

(54) METHOD FOR MODIFYING SURFACE OF METAL BIPOLAR PLATE AND BIPOLAR PLATE FOR FUEL CELL

(71) Applicant: INDUSTRIAL TECHNOLOGY RESEARCH INSTITUTE, Hsinchu (TW)

(72) Inventors: Ho-Yen Hsieh, Hsinchu (TW); Wen-Lin Wang, Hsinchu (TW); Ching-Ying Huang, Hsinchu (TW)

(73) Assignee: Industrial Technology Research Institute, Chutung Township, Hsinchu County (TW)

( * ) Notice: Subject to any disclaimer, the term of this patent is extended or adjusted under 35 U.S.C. 154(b) by 372 days.

(21) Appl. No.: 13/964,636

(22) Filed: Aug. 12, 2013

(65) Prior Publication Data
US 2014/0051012 A1 Feb. 20, 2014

(30) Foreign Application Priority Data
Aug. 16, 2012 (TW) .............................. 101129682 A (51) Int. Cl.
*H01M 8/02* (2016.01)

(52) U.S. Cl.
CPC ......... *H01M 8/0204* (2013.01); *H01M 8/0213* (2013.01); *H01M 8/0228* (2013.01); *H01M 8/0254* (2013.01); *Y02E 60/50* (2013.01)

(58) Field of Classification Search
CPC ........... H01M 8/0204; H01M 8/0254; H01M 8/0228; H01M 8/0213; Y02E 60/50
See application file for complete search history.

(56) References Cited

U.S. PATENT DOCUMENTS

| 6,291,094 B1 | 9/2001 | Yoshimura et al. | |
| 6,828,040 B2 | 12/2004 | Cunningham et al. | |
| 2006/0267235 A1* | 11/2006 | Ma | B29C 70/025 264/105 |
| 2008/0095994 A1* | 4/2008 | Jiang | H01M 8/0213 428/212 |
| 2008/0149900 A1* | 6/2008 | Jang | H01B 1/122 252/511 |
| 2009/0017361 A1* | 1/2009 | Lim | B29C 43/003 429/514 |
| 2010/0047650 A1* | 2/2010 | Iino | H01M 8/0213 429/479 |
| 2011/0177419 A1 | 7/2011 | Luoma et al. | |

FOREIGN PATENT DOCUMENTS

CN 101371385 2/2009

OTHER PUBLICATIONS

"Bipolar plates made of plain weave carbon/epoxy composite for proton exchange membrane fuel cell" by Minkook Kim, Ha Na Yu, Jun Woo Lim, Dai Gil Lee; "International Journal of Hydrogen Energy", 2012; vol. 37, pp. 4300-4308.

(Continued)

*Primary Examiner* — Brittany Raymond
(74) *Attorney, Agent, or Firm* — Muncy, Geissler, Olds & Lowe, P.C.

(57) ABSTRACT

A method for modifying the surface of a metal bipolar plate is provided. The method includes the steps of providing a metal substrate having a conducting adhesion layer on a surface thereof, the metal substrate having a flow field structure at the surface thereof; applying expanded graphite powder onto the conducting adhesion layer; and press-fitting the expanded graphite powder and the metal substrate with a mold structurally corresponding to the flow field structure, to form a graphite layer covering the surface the metal substrate from the expanded graphite powder. A bipolar plate for a fuel cell is further provided.

14 Claims, 6 Drawing Sheets

(56) References Cited

OTHER PUBLICATIONS

"Carbon-based films coated 316L stainless steel as bipolar plate for proton exchange membrane fuel cells" by Yu Fua, C, d, Guoquiang Linb, Ming Houc, Bo Wub, Zhigang Shaoc, Baolian Yic; "International Journal of Hydrogen Energy"; 2009; vol. 34, pp. 405-409.

"Conductive amorphous carbon-coated 316L stainless steel as bipolar plates in polymer electrolyte membrane fuel cells", by Kai Fenga, Yao Shena, Hailin Sunb, Dongan Liuc, Quanzhang Ana, d, Xun Caia, Paul K. Chud; "International Journal of Hydrogen Energy", 2009; vol. 34, pp. 6771-6777.

"Preparation and properties on the graphite/polypropylene composite bipolar plates with a 304 stainless steel by compression molding for PEM fuel cell" by Yang-Bok Lee, Chonng-Hyun Lee, Kyung-Min Kim, Dae-Soon Lim; International Journal of Hydrogen Energy; 2011; vol. 36, pp. 7621-7627.

"Protective graphite coating on metallic bipolar plates for PEMFC applications" by Wen-Lin Wanga, Shu-Mei Heb, Chao-Ho Lana; "Electrochimica Acta"; 2012; vol. 62, pp. 30-35.

"New Materials and Procedures to Protect Metallic PEM Fuel Cell Bipolar Plates" by N.. Cunningham, D. Guay, J.P. Dodelet, Y. Meng, A.R. Hlil, and A.S. Hayb, Journal of the Electrochemical Society, vol. 149, (2002) pp. A905-A911.

\* cited by examiner

METHOD FOR MODIFYING SURFACE OF METAL BIPOLAR PLATE AND BIPOLAR PLATE FOR FUEL CELL

CROSS-REFERENCE TO RELATED APPLICATIONS

This application claims priority to Taiwanese Patent Application No. 101129682, filed on Aug. 16, 2012, the disclosure of which is hereby incorporated by reference herein.

TECHNICAL FIELD

This disclosure relates to methods for modifying the surface of a metal bipolar plate and bipolar plates for fuel cells, and particularly, to a method for modifying the surface of a metal plate by using graphite and a bipolar plate having a graphite layer.

BACKGROUND

Fuel cells are highly efficient, safe in operations, and low in pollution. Therefore, they are applied in a variety of fields, such as electric power, industry, transportation, aeronautics, military, and the like. A fuel cell is a power generating device, which can continuously and directly converting chemical energy into electrical energy. When a fuel cell is in operation, a fuel gas (such as hydrogen gas) and a combustion promoter (such as oxygen gas) are delivered to the anode and cathode of the fuel cell, respectively. Oxidation and reduction then take place to convert chemical energy into electrical energy.

The structure of a conventional fuel cell unit is substantially consisted of an anode plate, a cathode plate, and a solid electrolyte film interposed between the anode plate and the cathode plate, and is referred to as a battery cell. However, in practical uses, multiple battery cells may be connected in series, so as to achieve a greater output voltage. Adjacent fuel cell units have a common electrode plate, which serves as the anode and cathode of the two adjacent fuel cell units, respectively. Thus, the electrode plate is referred to as a bipolar plate.

Currently, in the structure of a bipolar plate for a fuel cell, a polymeric material is overlaid on a stainless steel substrate by spray-coating, and the polymeric material is bonded to the substrate as a result of pyrolysis. At least 90% of conductive graphite is added to the polymeric material to block corrosion and oxidation caused by the external environment to the stainless steel substrate, and to confer conductivity to the stainless steel substrate. However, the conductive protective film is formed by spray-coating, whereby the solvent in the polymeric material in the film evaporates during pyrolysis, such that numerous small air bubbles are generated in the conductive protective film finally formed. This causes the conductive protective film to have poor density. Further, the small air bubbles serve as channels for the infiltration of the acidic solution of a fuel cell into the bipolar plate. Moreover, film formation on the overlaid layer formed by a coating process is ineffective at a specific angle on the flow field structure, because the flow field structure at the surface of the metal substrate have a complex structure along the horizontal and vertical directions. Hence, multiple layers of polymeric materials must first be coated on the surface of the stainless steel substrate, and then conducting a number of pyrolytic processes, in order to avoid the occurrence of the aforesaid problems. Nevertheless, this makes the processing procedures for the bipolar plate be too complicated, and also makes the production cost be too expensive.

Further, a gas separator, which uses a tin paste to bond a graphite layer to a stainless steel base, has been developed. Specifically, heating and pressurizing are utilized to bond the graphite layer to the stainless steel substrate via an interposed tin layer. However, the tin-containing gas separator would poison a fuel cell and the graphite layer has hetero junction with the tin layer, such that delamination occurs among the layers due to poor strengths. Moreover, acid solution may permeate the graphite layer to corrosion the tin layer and poison MEA to make PEM fuel cell break down.

In addition, a bipolar plate comprised of a resin material has been developed which involves the preparation of a plurality of molded sheets containing carbon materials, and then press-fitting of the molded sheet to obtain the bipolar plate. However, the problem of poor air tightness of the bipolar plate results from the control of the composite carbon board to extreme thinness.

SUMMARY

The present disclosure provides a method for modifying a surface of a metal bipolar plate, including the steps of providing a metal substrate having a conducting adhesion layer on the surface thereof, the metal substrate having a flow field structure at the surface thereof; applying expanded graphite powder onto the conducting adhesion layer; and press-fitting t the metal substrate and the expanded graphite powder with a mold structurally corresponding to the flow field structure, so as to form a graphite layer covering the surface of the metal substrate from the expanded graphite powder.

The present disclosure further provides a bipolar plate for a fuel cell, including a metal substrate having a flow field structure; and a conducting adhesion structure formed on the metal substrate, the conducting adhesion layer including a polymeric adhesive and a plurality of conductive particles; and a graphite layer formed on the conducting adhesion layer by structurally corresponding to the flow field structure of the metal substrate, the graphite layer being adhered to the metal substrate via the conducting adhesion layer, wherein the graphite layer is primarily comprised of expanded graphite powder, and a portion of the expanded graphite powder is embedded into the conducting adhesion layer.

BRIEF DESCRIPTION OF THE DRAWINGS

FIGS. 1A to 1E are schematic diagrams of a method for producing a bipolar plate for a fuel cell according to the present disclosure, wherein

DETAILED DESCRIPTION

In the following, specific embodiments are provided to illustrate the detailed description of the present disclosure.

Those skilled in the art can easily conceive the other advantages and effects of the present disclosure, based on the specification.

Please refer to FIGS. 1A to 1E, which illustrate a method for modifying the surface of a metal bipolar plate according to one embodiment of the present disclosure.

Figure 1A:
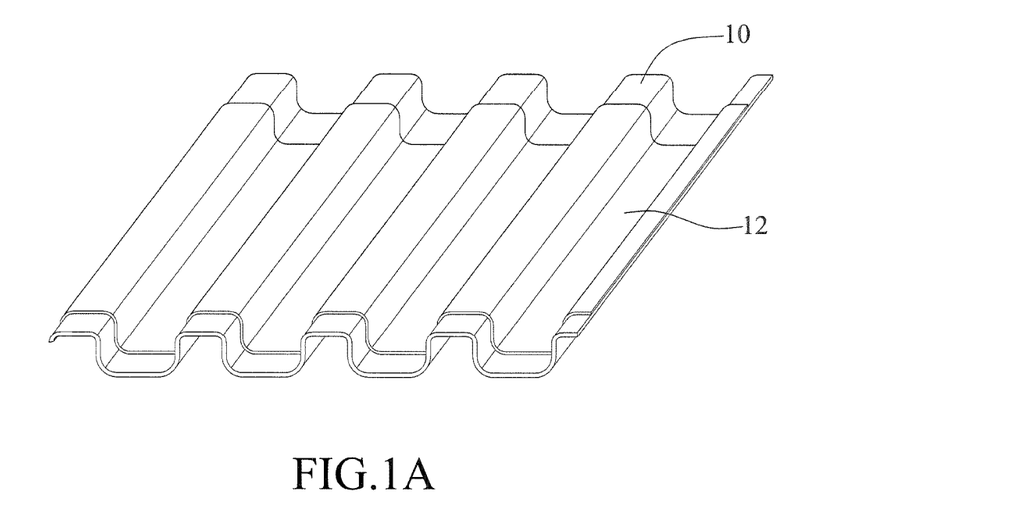

As shown in FIG. 1A, a metal substrate 10 is prepared. The surface of the metal substrate 10 can be, for example, coated by using a scraper, spin-coated, spray-coated, slit-coated or rolling-coated, in advance, to form a conducting adhesion layer 12.

The materials of the above metal substrate, include, but not limited to, at least one of aluminum, copper, nickel, chromium and stainless steel. The material of the metal substrate can also be stainless steel. The metal substrate can be a flat plate, or one having a flow field structure at the surface thereof. Taking the metal bipolar plate of a fuel cell as an example, the metal bipolar plate can be a metal substrate having a flow field structure. The flow field structure can be zigzag or snaking, or having a plurality of straight channels. The thickness of the metal substrate can range from 0.03 mm to 10 mm.

In the embodiment, the conducting adhesion layer includes a polymeric adhesive and a plurality of conductive particles. Examples of the polymeric adhesives are thermosetting resins, photo-curable resins or chemically curable resins. The materials of the conductive particles are metals, metal alloys, metal carbides, metal nitrides, carbon particles or a combination thereof. For example, the metals or the metals in the metal carbides or metal nitrides are each at least one independently selected from the group consisting of gold, platinum, palladium, nickel and chromium. The metals in the metal alloys are at least two elements selected from the group consisting of gold, platinum, palladium, nickel and chromium. Usually, the conductive particles made of metals, metal alloys, metal carbides or metal nitrides have particle diameters ranging from 10 nm to 100 μm.

In one embodiment, the carbon particles are each at least one selected from the group consisting of a graphite material, a carbon nanocapsule, carbon black, a carbon nanotube and a carbon fiber. The carbon particles have particle diameters ranging from 10 nm to 100 μm. However, the powder having excellent conductivity and suitable particle diameters can be selected based on the practical user needs. Hence, the carbon particles are not limited to the examples disclosed.

Usually, the thermosetting resins, photo-curable resins or chemically curable resins added with the conductive particles are stirred by using a mechanical equipment or manually, so as to disperse the conductive particles in the resins. A conducting adhesion layer is then formed by coating using a scraper, spin-coating, spray-coating, slit-coating or rolling-coating. The conductive particles take 10% to 70% of the volume of the conducting adhesion layer.

Figure 1B:
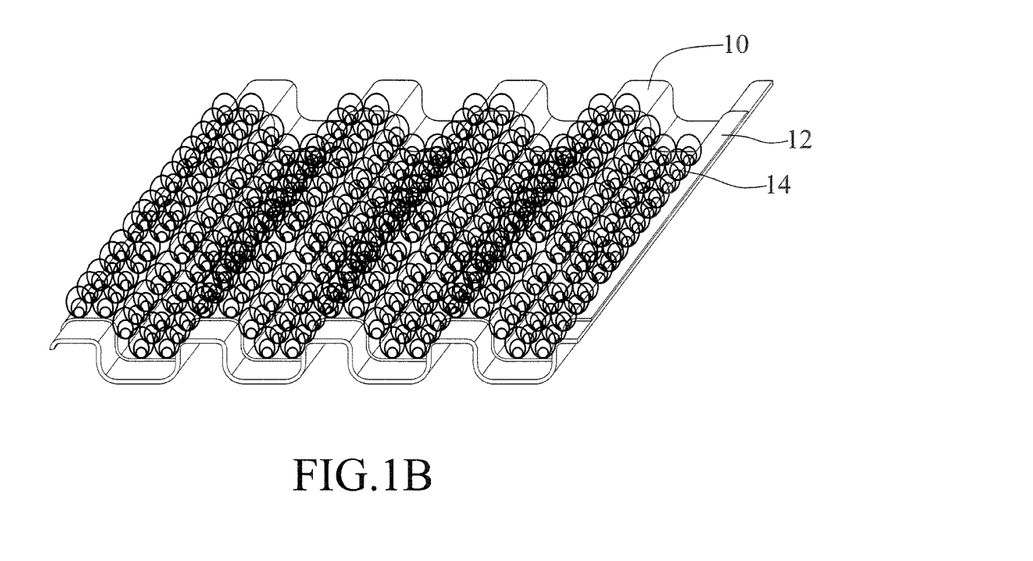

Then, as shown in FIG. 1B, expanded graphite powder 14 is applied onto the metal substrate 10 having a conducting adhesion layer 12 at the surface thereof. The expanded graphite powder 14 is obtained by acidifying and heating flaked graphite. The acids used in the acidification include sulfuric acid, nitric acid or a combination thereof.

Moreover, in one embodiment, the flaked graphite having a mesh number ranging from 15 to 200 is selected. The flaked graphite comprises 40% to 100% of flaked graphite having a mesh number of from 15 to 100, 0% to 50% of flaked graphite having a mesh number of from 101 to 200.

In a further embodiment, when the mesh number is smaller than 20, the surface of the formed graphite layer is rough, and contains many pores and fine crazing. When the graphite layer is used in a fuel cell, the acidic solution is likely to infiltrate and etch the metal substrate. When the mesh number is greater than 200, the formed graphite layer also has many voids. Further, the graphite layer has poor strength, such that it is prone to cracking. In another embodiment, the flaked graphite having a mesh number ranging from 30 to 80 is selected.

Figure 2:
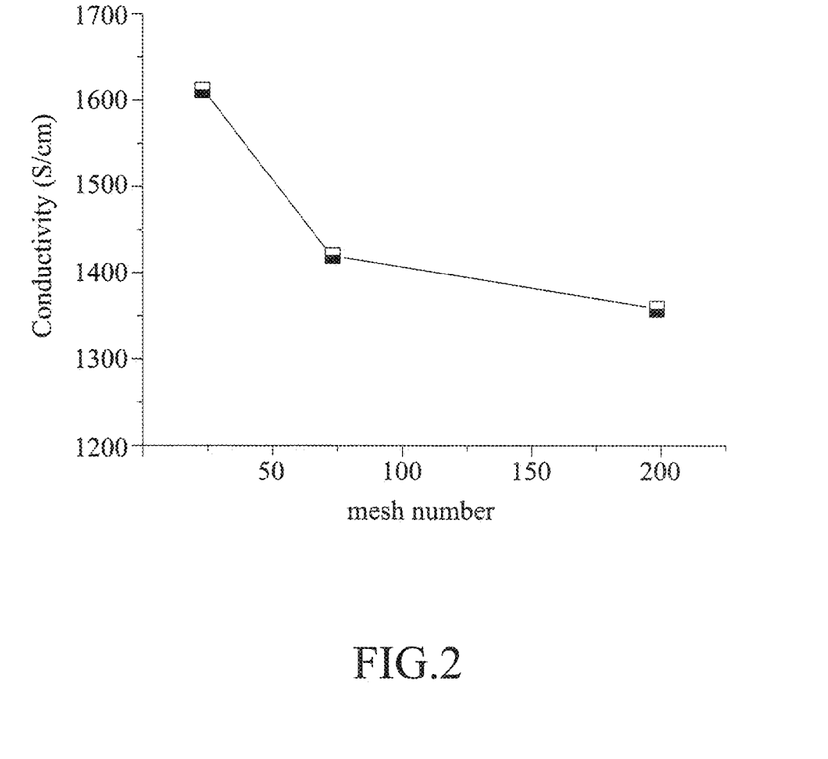
FIG. 2 is a graph depicting the relationship between the mesh number of flaked graphite and conductivity.

Please also refer to FIG. 2, which depicts the results of the conductivity measurements using the flaked graphite having a mesh number ranging from 32 to 200. In FIG. 2, the flaked graphite having a mesh number of 32 has higher conductivity. Although the conductivity of the flaked graphite having a mesh number of 200 decreases, it is still desirable. The conductivity of the flaked graphite having a mesh number of 80 is still higher than 1400 S/cm.

Furthermore, the approach for applying the expanded graphite powder is not particularly limited. The expanded graphite powder can be applied onto the conducting adhesion layer mechanically or manually. The amount of the expanded graphite powder used preferably ranges from 5 to 50 mg/cm$^3$.

Figure 3:
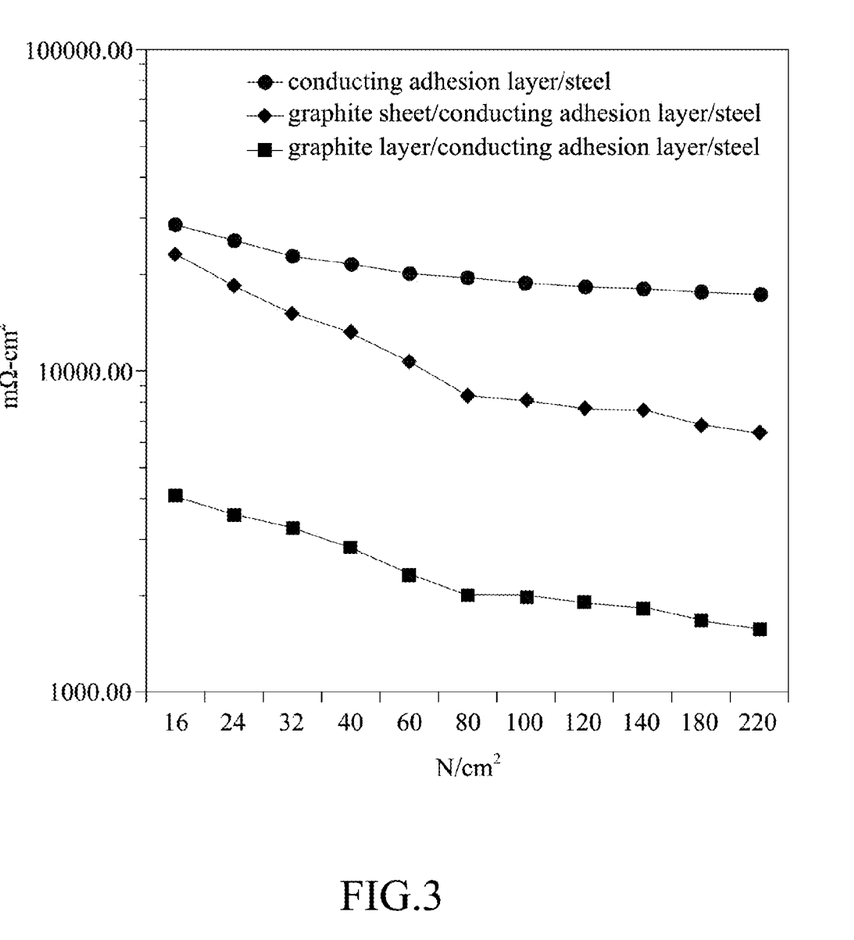
FIG. 3 is a graph depicting the resistances in the presence or absence of a graphite layer according to the present disclosure or a commercially available graphite sheet.

Moreover, please refer to FIG. 3, as compared with the metal substrates comprising a graphite layer according to the present disclosure or a commercially available graphite sheet laid over a conducting adhesion layer, the metal substrate comprising just the conducting adhesion layer has a much higher resistance. Further, by comparing the metal substrate comprising the graphite layer and the graphite sheet, it is found that the metal structure comprising the graphite sheet has a higher resistance. This results from that the graphite sheet is only loosely attached to the conducting adhesion layer on the top of the metal substrate, not like the graphite layer which is embedded into the conducting adhesion layer.

Figure 1C:
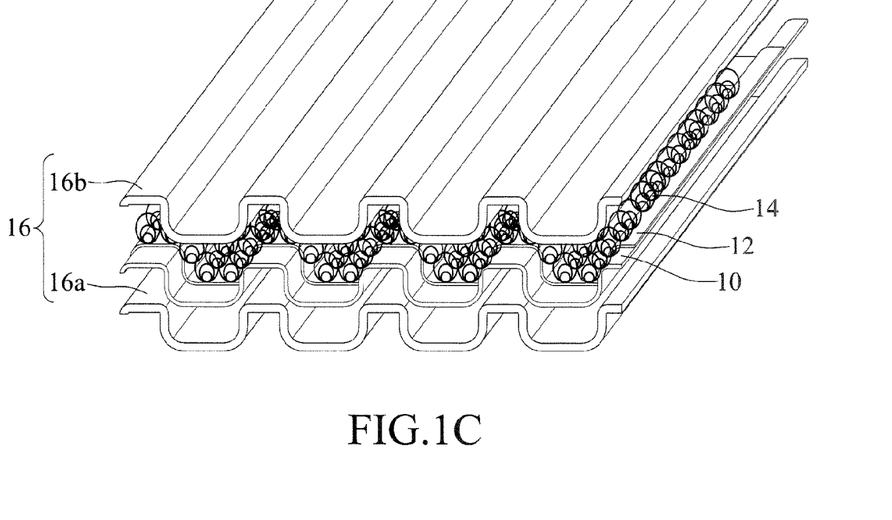
Figure 1D:
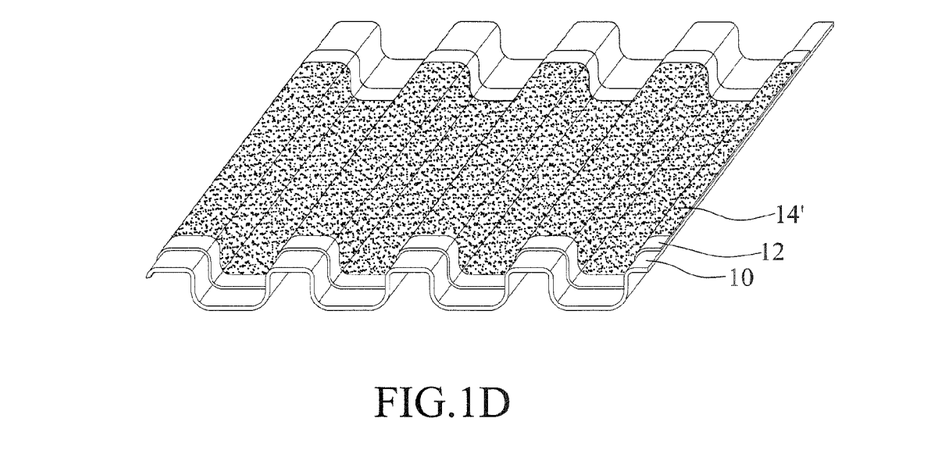

Please refer further to FIGS. 1C and 1D. In FIGS. 1C and 1D, after applying the expanded graphite powder 14, press-fitting the metal substrate 10 and the expanded graphite powder 14 with a mold 16 structurally corresponding to the flow field structure is performed, so as to form a graphite layer 14' from the expanded graphite powder 14; and the graphite layer 14' is adhered to the metal substrate 10 via the conducting adhesion layer 12. In one embodiment, the metal substrate is received in the mold. For example, the metal substrate can be received in the mold after forming the conducting adhesion layer; or the metal substrate is placed in the mold after forming the conducting adhesion layer on the metal substrate. In one embodiment, the metal substrate 10 is received in a lower mold 16a. During press-fitting, an upper mold 16b is used to press against the expanded graphite powder 14.

In another embodiment, only the upper mold can be used to press against the expanded graphite powder (not shown in the figures), because the metal substrate has rigidity.

In addition, the metal substrate of the metal bipolar plate has a flow field structure. When the metal bipolar plate for a fuel cell is applied, the mold used can structurally correspond to the flow field structure to form a graphite layer. The graphite layer can have a complete coverage over the substrate by being in compliance with the flow field structure, and thereby forming a dense graphite protective layer. Particularly, regardless of what configuration the flow field structure the metal substrate has, the graphite protective layer can indeed be formed by press-fitting with the mold in the horizontal and vertical directions of the flow field structure, as indicated in by the present disclosure. Hence, the effect of sufficiently protecting the metal substrate is achieved. Usually, press-fitting the metal substrate and the expanded graphite powder by the mold is conducted at a press-fitting strain ranging from 10 to 1000 kg/cm$^2$.

In one embodiment, the thickness of the graphite layer is greater than the thickness of the conducting adhesion layer, in order to make the surface of the graphite layer a uniformly dense surface. For example, the thickness of the graphite layer ranges from 10 μm to 1 mm. The thickness of the conducting adhesion layer ranges from 0.5 to 500 μm.

Figure 1E:
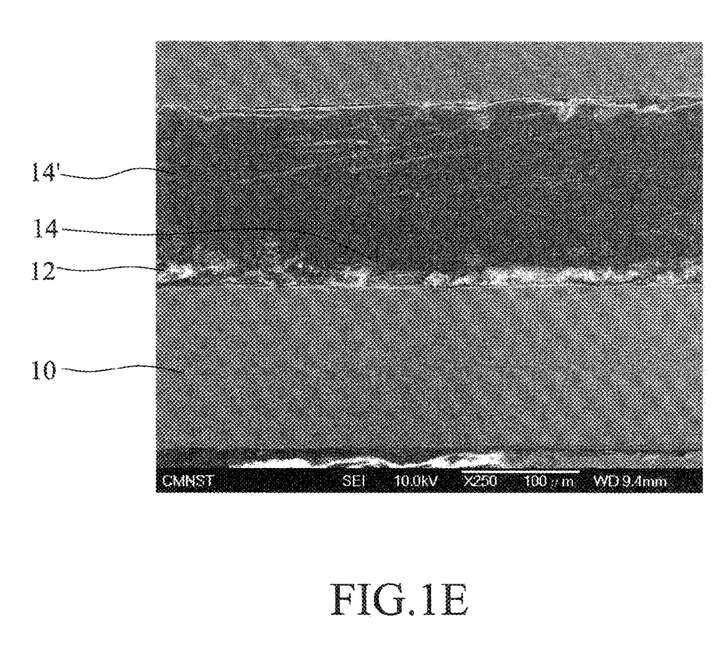
FIG. 1E is a photograph of a cross-section of the bipolar plate for a fuel cell.

Furthermore, as shown in FIG. 1E, the conducting adhesion layer 12 is a polymer. Hence, when the expanded graphite powder 14 is embedded in the polymer during press-fitting, the impedance at the hetero junction is eliminated, the etching of the metal substrate 10 by the acidic solution is avoided, and the bonding strength is increased.

According to the aforesaid method, the present disclosure further provides a bipolar plate for the fuel cell, including: a metal substrate having a flow field structure; and a conducting adhesion layer formed on the metal substrate, the conducting adhesion layer having a polymeric adhesive and a plurality of conductive particles; and a graphite layer formed on the conducting adhesion layer by structurally corresponding to the flow field structure of the metal substrate, the graphite layer being adhered to the metal substrate via the conducting adhesion layer, wherein the graphite layer is primarily comprised of expanded graphite powder, and a portion of the expanded graphite layer is embedded into the adhesive, wherein the expanded graphite powder is obtained by acidifying and heating flaked graphite having a mesh number of from 15 to 200.

In one embodiment, the thickness of the graphite layer is greater than the thickness of the conducting adhesion layer. For example, the thickness of the graphite layer ranges from 10 μm to 1 mm, and the thickness of the conducting adhesion layer ranges from 0.5 to 500 μm.

The materials of the conductive particles are metals, metal alloys, metal carbides, metal nitrides, carbon particles or a combination thereof. For example, the metals or the metals in the metal carbides or metal nitrides are each at least one independently selected from the group consisting of gold, platinum, palladium, nickel and chromium. The metals in the metal alloys are at least two elements selected from the group consisting of gold, platinum, palladium, nickel and chromium. Usually, the conductive particles take of metals, metal alloys, metal carbides or metal nitrides have particle diameters ranging from 10 nm to 100 μm.

In one embodiment, the carbon particles are each at least one selected from the group consisting of a graphite material, a carbon nanocapsule, carbon black, a carbon nanotube and a carbon fiber. The carbon particles have particle diameters ranging from 10 nm to 100 μm. Further, the conductive particles take 20% to 80% of the volume of the conducting adhesion layer.

Test Example

In the test example, 1 mm stainless steel 316L was selected as a material of the metal substrate with a flow field structure. The epoxy resin and carbon black were mixed to form a composition of the conducting adhesion layer coated on the metal substrate, and the ratio of carbon black was 40 volume %. The other conductive particles such as carbon, metal nitride and metal carbide, could also be added to the conductive resin. Then, expanded graphite, which was obtained by acidifying and heating flaked graphite, was disposed over the substrate with a conducting adhesion layer with a thickness of 50 μm. The mixed flaked graphite including 75% of the flaked graphite having a mesh number of 50, and including 25% of the flaked graphite having a mesh number of 150. The amount of the expanded graphite was 25 mg/cm$^2$. Press-fitting with the mold in the horizontal and vertical directions of the flow field structure was used to form the graphite layer, and the strain of the press-fitting was 500 kg/cm$^2$. The thickness of graphite layer was 150 μm. Therefore, a metal bipolar plate with a conducting adhesion layer and a graphite layer was obtained by the process.

Figure 4A:
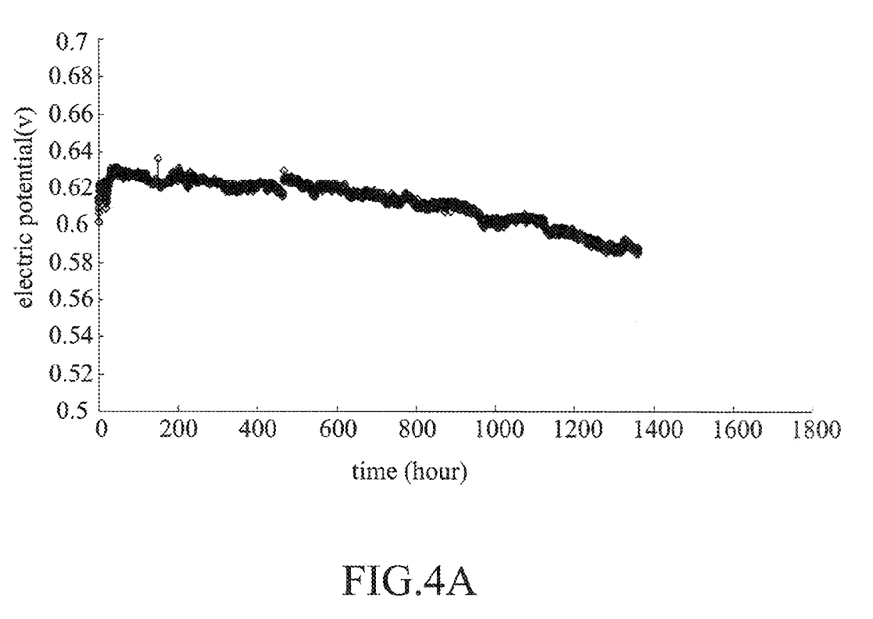
FIGS. 4A and 4B are graphs depicting the voltage decay rates in the presence or absence of an overlaid graphite layer.
Figure 4B:
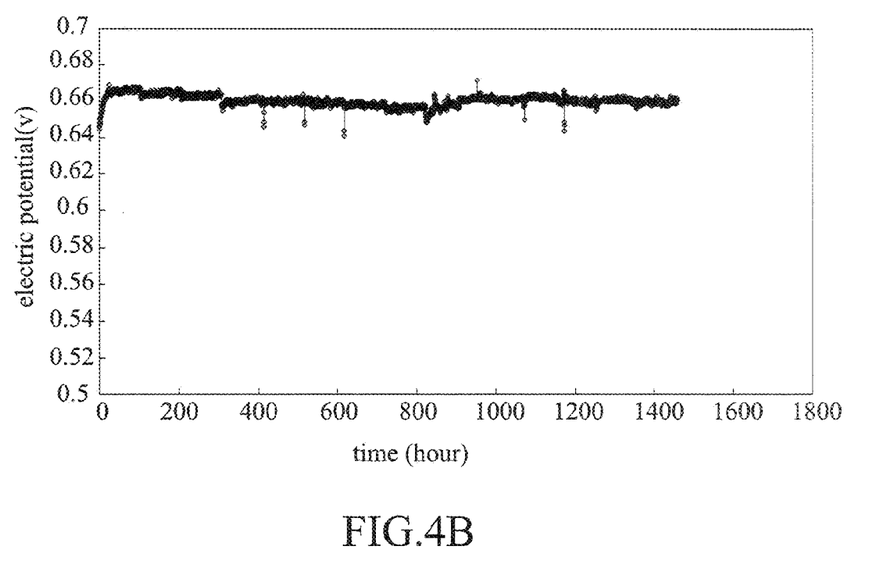

Please refer to FIGS. 4A to 4B, which depict the voltage decay rates of the bipolar plates with and without an overlaid graphite layer.

The fuel cell testing instrument used in the test example took measurements according to the constant-current discharge testing method. As shown in FIG. 4A, when only the 316L stainless steel is used as the bipolar plate, the voltage decay rate is already greater than 60 μV/h at the 1000$^{th}$ hour.

As shown in FIG. 4B, the conducting adhesion layer has a thickness of 40 μm. The conducting adhesion layer further includes 60% of carbon-containing conductive particles. The conducting adhesion layer is overlaid with the graphite layer, which is made of expanded graphite. The expanded graphite is obtained by acidifying and heating flaked graphite having a mesh number of 30, and press-fitting the flaked graphite at a press-fitting strain of 500 kg/cm$^2$. The bipolar plate has a voltage decay rate of still less than 10 μV/h, after being tested for 1000 hours.

The foregoing descriptions of the detailed embodiments are only illustrated to disclose the principles and functions of the present disclosure, and not used to limit the scope of the present disclosure. It should be understood by those in the art that alterations can be made to the above embodiments, without departing from the spirit and scope of the disclosure of the present disclosure. The scope of the disclosure of the present disclosure shall fall within the scope of the appended claims.

What is claimed is:

1. A method for modifying a surface of a metal substrate, comprising the steps of:
   providing the metal substrate having a conducting adhesion layer on the surface thereof, wherein the metal substrate is formed with a flow field structure, and the conducting adhesion layer comprises a polymeric adhesive and a plurality of conductive particles;
   applying expanded graphite powder on the conducting adhesion layer; and
   press-fitting the metal substrate and the expanded graphite powder with a mold structurally corresponding to the flow field structure, so as to form a graphite layer covering the metal substrate.

2. The method of claim 1, wherein the expanded graphite powder is obtained by acidifying and heating flaked graphite having sizes between mesh 15 and 200.

3. The method of claim 2, wherein the flaked graphite comprises 40% to 100% of flaked graphite having a mesh number of from 15 to 100, and 0% to 50% of flaked graphite having a mesh number of from 101 to 200.

4. The method of claim 1, wherein the expanded graphite powder is used in an amount ranging from 5 to 50 mg/cm$^2$.

5. The method of claim 1, wherein the step of press-fitting is performed at a strain ranging from 10 to 1000 kg/cm$^2$.

6. The method of claim 1, wherein the step of press-fitting comprises molding process or rolling process.

7. The method of claim 1, wherein the conductive particles are made of a material selected from the group consisting of a metal, a metal alloy, a metal carbide, a metal nitride, a carbon particle and a combination thereof.

8. The method of claim 7, wherein at least one of the metal, the metal carbide and metal nitride comprises gold, platinum, palladium, nickel or chromium.

9. The method of claim 7, wherein the metal alloy comprises at least two elements selected from the group consisting of gold, platinum, palladium, nickel and chromium.

10. The method of claim 7, wherein the conductive particles have particle diameters ranging from 10 nm to 100 μm.

11. The method of claim 7, wherein the carbon particle is made of at least one selected from the group consisting of a graphite material, a carbon nanocapsule, carbon black, a carbon nanotube and a carbon fiber.

12. The method of claim 1, wherein the conductive particles take 10% to 70% of a volume of the conducting adhesion layer.

13. The method of claim 1, wherein the polymeric adhesive is at least one selected from the group consisting of a thermosetting resin, a photo-curable resin and a chemically curable resin.

14. The method of claim 1, wherein the metal substrate comprises a material selected from the group consisting of aluminum, copper, nickel, chromium and stainless steel.

* * * * *